Patented Jan. 8, 1946

2,392,353

UNITED STATES PATENT OFFICE 2,392,353

FLUX-FORMING FUEL, AND METHOD FOR THERMALLY WORKING MINERALS THEREWITH

Robert B. Aitchison, Grasmere, N. Y., assignor to The Linde Air Products Company, a corporation of Ohio No Drawing. Application January 15, 1943, Serial No. 472,487

6 Claims. (Cl. 255—1.8)

This invention relates to a flux-forming fuel, and to a process for thermally working meltable mineral and like materials therewith. More particularly, the invention concerns an unbonded comminuted flux-forming fuel and a process using the same for thermally producing deep holes in meltable mineral and like materials such as concrete, iron ore, or trap rock, having a high silica content. The present application is a continuation-in-part of Patent No. 2,327,482 entitled "Mineral cutting and piercing," issued August 24, 1943, to R. B. Aitchison, C. W. Swartout, and V. C. Williams.

In Patents 2,286,191 and 2,286,192 of R. B. Aitchison et al. there are disclosed novel processes and apparatus for thermally working mineral materials with an oxy-fuel flame, as by piercing in them holes for blasting. Either a spalling procedure or a melting procedure may be followed, depending primarily upon the character of the mineral material to be worked. When forming a hole in a solid mass of material such as concrete, iron ore, or trap rock, having a high silica content, the melting procedure is followed by applying against the mass an intense oxy-fuel flame from a long tubular blowpipe, and advancing the blowpipe straight into the mass as material is melted off and a hole is formed. Usually a continuous stream of an unbonded comminuted metallic flux-forming fuel material is carried into the melting zone in suspension in the fuel gas, burning there and providing intense heat, as well as forming oxides which combine with the molten mineral material or slag to increase its fluidity. A pneumatic powder dispenser ordinarily is provided for suspending the powdered material in the fuel gas before the gas enters the blowpipe.

One of the main objects of the present invention is the provision of a novel unbonded comminuted flux-forming fuel having particular value for rapidly and economically working masses of mineral materials and the like by a thermal melting procedure. Another object is the provision of such a novel flux-forming fuel, containing iron, zirconium, and silicon, which is particularly useful for piercing deep holes in mineral materials and the like having a high silica content. Still another object is the provision of a novel process for thermally working meltable mineral materials, using the novel flux-forming fuel of the invention.

The above and other objects, and the novel features of the invention, will become apparent from the following description.

The novel flux-forming fuel of the present invention comprises a comminuted unbonded composition containing, in intimate relationship, iron, zirconium, and silicon. A suitable and conveniently produced fuel having such a composition comprises, by weight, pulverulent zirconium-silicon alloy in minor part, the remainder being chiefly pulverulent iron. The zirconium-silicon alloy employed in the novel mixture may comprise, by weight, 10% to 50% of zirconium and 30% to 60% of silicon, the remainder being principally iron. It is to be understood that the flux-forming fuel may be formed in other ways, as by mixing together the constituents in their elemental form, or by mixing together different alloys containing the necessary constituents in amounts calculated to produce the desired composition. It is desirable that the particles in the mixture be between 200 and 300 mesh (Tyler) in size, but the fineness of the particles is not critical.

The preferred ranges of composition for the novel comminuted unbonded flux-forming fuel composition are, by weight, 1% to 15% zirconium, 1% to 18% silicon, the remainder being chiefly iron. Such a composition may be formed by intimately mixing 5% to 30% of the zirconium-silicon alloy particles mentioned previously herein with pulverulent iron. Excellent results in thermally working mineral and like materials have been obtained with a comminuted unbonded flux-forming fuel composition containing, by weight, about 6% zirconium, about 8% silicon, the remainder being principally iron. A practical way of producing such a composition is to form a mixture wherein zirconium-silicon alloy particles constitute 15% of the mixture by weight and the iron particles constitute 85% of the mixture, the particular zirconium-silicon alloy used in the mixture consisting 40% of zirconium, 51% of silicon, and 9% of iron, by weight.

It has been found that the comminuted flux-forming fuels described in the preceding paragraphs, when burned in gaseous oxygen, provide enormous quantities of heat at high temperatures; and that the resulting oxides will unite with molten mineral and like materials to modify the slag compositions and increase slag fluidity. The combined effects of the high temperature and the modification of the slag compositions are the provision of an unusually free-flowing slag which is of great advantage in thermal mineral working operations.

The novel process for thermally working meltable mineral masses and the like, according to the present invention, comprises separating material from such a mass and forming a hole therein by applying an intense oxy-fuel flame from a blowpipe against a portion of the mass, while introducing into the flame and against the mass a flowing stream of the novel comminuted unbonded flux-forming fuel previously described herein. Although the process using the novel flux-forming fuel is advantageous on most meltable mineral materials, it offers its greatest advantages when applied to mineral materials of the nature of concrete, iron ore, or trap rock, having a high silica content.

The highly fluid slag produced by the combined action of the flame, and the metallic oxides formed when the flux-forming fuel burns, may be removed from the hole in the liquid state by the gaseous products of combustion, often assisted by an auxiliary ejection fluid such as compressed air. An alternative procedure is to remove the slag in the liquid condition only from adjacent the melting zone, after which it is quenched and solidified by water and either disintegrates spontaneously or may be disintegrated mechanically. The disintegrated particles are then washed out of the hole by the water and the gaseous products of combustion. The process is particularly applicable to the piercing of deep blasting holes of circular cross-section extending straight into a mass of mineral material. However, the principles of the process of the invention also may be applied to the production of other holes in the nature of grooves or cuts.

Typical apparatus for performing the process of the invention is shown and described in application Serial No. 470,839, filed December 31, 1942, by Virgil C. Williams.

In a typical example of the thermal working of mineral and like materials by the process of the invention, a hole 48 inches deep was drilled in 31 minutes in a large mass of concrete, using a flame from a long oxy-acetylene blowpipe and a flux-forming fuel mixture composed, by weight, 15% of powdered zirconium-silicon alloy (40% zirconium, 51% silicon, 9% iron) and 85% of iron powder, carried in the acetylene stream.

It is to be understood that the novel comminuted flux-forming fuel mixture, and the novel process of the invention, are capable of modification within the scope of the invention as defined by the claims attached hereto.

What is claimed is:

1. A flux-forming fuel comprising a comminuted unbonded intimate mixture comprising in minor part pulverulent zirconium-silicon alloy, the remainder being substantially all pulverulent iron; said zirconium-silicon alloy comprising by weight 10% to 50% zirconium and 30% to 60% silicon, any remainder being substantially all iron.

2. A flux-forming fuel comprising a comminuted unbonded composition containing, by weight, 1% to 15% zirconium, 1% to 18% silicon, the remainder being substantially all iron.

3. A flux-forming fuel comprising a comminuted unbonded composition containing, by weight, about 6% zirconium, about 8% silicon, the remainder being substantially all iron.

4. In a process for thermally working mineral and like masses comprising separating and removing material from such a mass by applying an oxy-fuel flame to a portion thereof while introducing into such flame a comminuted flux-forming fuel, the improvement which consists in introducing said flux-forming fuel as a flowing stream of a comminuted unbonded intimate mixture comprising in minor part, by weight, pulverulent zirconium-silicon alloy, the remainder being substantially all pulverulent iron; said zirconium-silicon alloy comprising by weight 10% to 50% zirconium and 30% to 60% silicon, any remainder being substantially all iron.

5. In a process for thermally working mineral and like masses comprising separating and removing material from such a mass by applying an oxy-fuel flame to a portion thereof while introducing into such flame a comminuted flux-forming fuel, the improvement which consists in introducing said flux-forming fuel as a flowing stream of a comminuted unbonded composition containing, by weight, 1% to 15% zirconium, 1% to 18% silicon, the remainder being substantially all iron.

6. In a process for thermally working mineral and like masses comprising separating and removing material from such a mass by applying an oxy-fuel flame to a portion thereof while introducing into such flame a comminuted flux-forming fuel, the improvement which consists in introducing said flux-forming fuel as a flowing stream of a comminuted unbonded composition containing, by weight, about 6% zirconium, about 8% silicon, the remainder being substantially all iron.

ROBERT B. AITCHISON.